United States Patent [19]

Kingsbury

[11] Patent Number: 4,839,110
[45] Date of Patent: Jun. 13, 1989

[54] METHOD OF MOLDING USING GATED DIES

[75] Inventor: Jeffrey M. Kingsbury, Santa Rosa, Calif.

[73] Assignee: Sola USA, Inc., Petaluma, Calif.

[21] Appl. No.: 163,308

[22] Filed: Mar. 2, 1988

[51] Int. Cl.$^4$ .............................................. B29D 11/00
[52] U.S. Cl. ...................................... 264/2.2; 249/82; 264/328.2; 264/328.7; 264/328.9; 264/328.11; 425/557; 425/808
[58] Field of Search .................... 264/2.2, 328.7, 328.9, 264/328.11, 328.12, 328.2; 425/808, 352, 354, 355, 469, 557, 567, 812; 249/160, 82

[56] References Cited

U.S. PATENT DOCUMENTS 4,569,807  2/1986  Boudet ................................. 425/808
4,664,854  5/1987  Bakalar ................................ 425/808

Primary Examiner—James Lowe
Attorney, Agent, or Firm—Harris Zimmerman; Howard Cohen

[57] ABSTRACT

A method and apparatus for molding and casting ophthalmic lenses includes a front surface die and a back surface die slidably and removably received in the bore of a molding or casting apparatus. Molding or casting compound is introduced by conventional means between the two dies, and the dies are urged together to impress the die surfaces on the compound as the compound is cured by thermal or chemical means. At least one of the dies includes at least one gate channel formed in the edge thereof parallel to the axis of the bore and extending from the optical forming surface to a point adjacent to the opposite, external die surface. In compression molding, the gate channel comprises a vent through which excess molding compound is discharged from the molding cavity as the dies are urged together. As the gated die is fully inserted in the bore, the gate channel opening to the exterior is sealed, thus limiting the discharge effect and controlling the thickness of the molded part. In casting, the dies are partially inserted in the bore, and the gate channel serves as an injection channel to introduce the casting compound into the casting cavity. The dies are urged together in the bore, the gate channel first serves to vent excess casting compound from the casting cavity. Full die insertion in the bore causes the gate channel opening to the exterior to be sealed, thus limiting the discharge effect and controlling the thickness of the cast part.

5 Claims, 2 Drawing Sheets

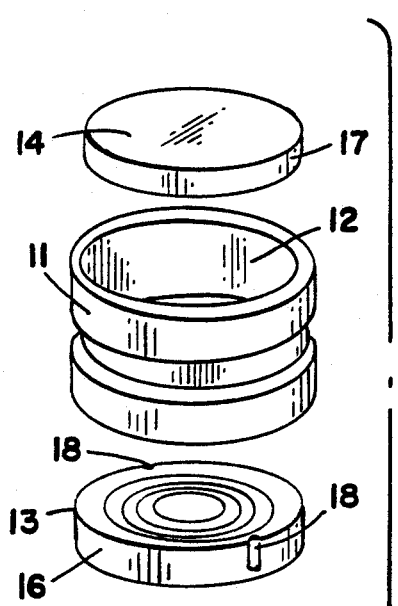
FIG_1
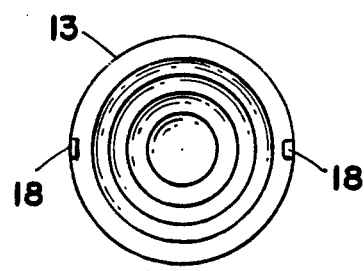
FIG_2
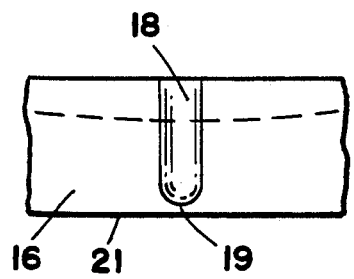
FIG_3
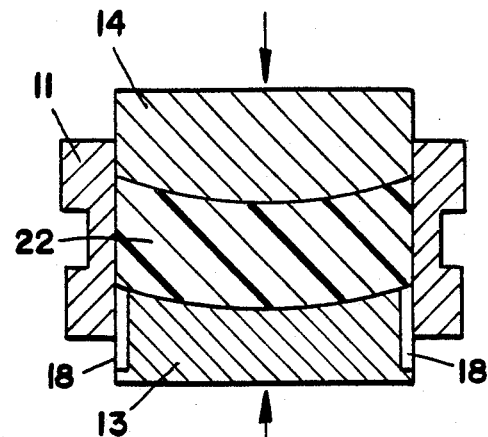
FIG_4
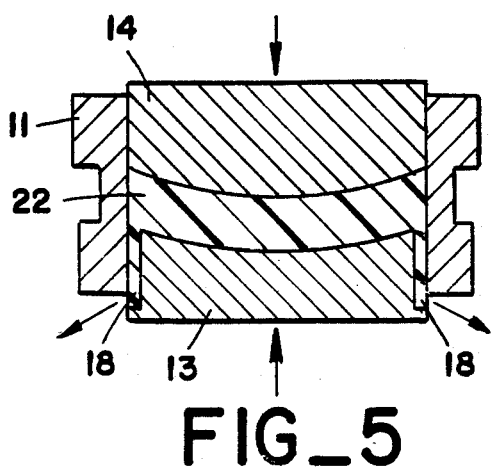
FIG_5
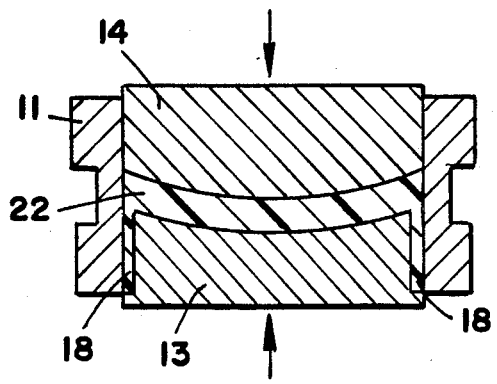
FIG_6

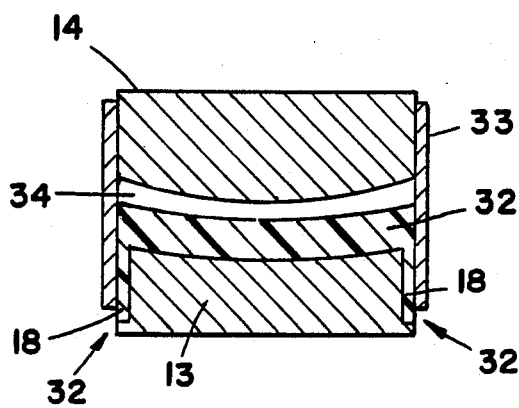
FIG_7
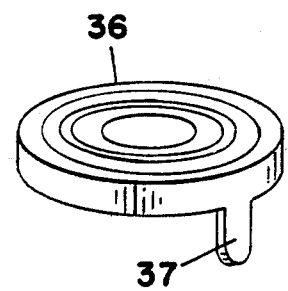
FIG_10
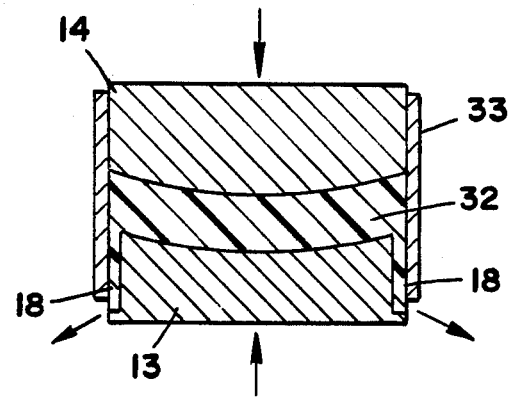
FIG_8
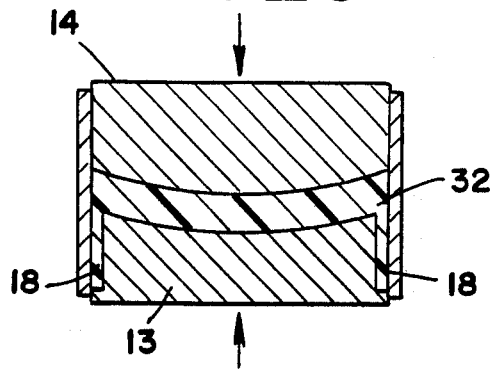
FIG_9

METHOD OF MOLDING USING GATED DIES

BACKGROUND OF THE INVENTION

In the field of manufacturing of ophthalmic lenses and the like, there is a great amount of interest in devising fabrication processes that are simple and economical, and which produce quality lenses requiring little or no finishing subsequent to manufacturing. Following these criteria, developmental efforts have focused on casting and molding of lenses from thermoplastic, thermosetting plastic, and polymerizable materials, due to the inherent economies of scale and the potential for reduced handling and labor costs of such processes.

In casting and molding processes in general, front surface and back surface dies are used to impart to the plastic material the optical surfaces appropriate for the desired ophthalmic correction. In casting processes in general, the dies are secured together by a gasket or the like at a desired spacing, and a liquid casting material is introduced in the casting cavity defined thereby, and allowed to cure and harden into a lens. A critical factor is the gasket, and that a large plurality of gaskets are required to accommodate and seal with the large plurality of differing optical surfaces of the various dies while also defining the desired die spacing (and lens thickness). Thus a large capital investment is required in gaskets and gasket tooling, as well as in the optical surface forming dies used in the casting process.

In molding processes in general, more rugged dies are employed to compress a moldable material in a closed molding cavity, impressing the optical surface configurations on the material as the material is hardened by thermal or chemical means. Generally speaking, an excess of molding material must be introduced into the cavity to allow for compressive die movement, and means must be provided to vent the excess material from the cavity and accommodate the sprues formed thereby. Also, as in the casting process, the dies must be urged together to the appropriate spacing to create the desired lens thickness. The amount of molding material, the venting of excess material, and the final thickness of the lens are interrelated factors that require precise process control to produce lenses of high quality for ophthalmic use.

SUMMARY OF THE PRESENT INVENTION

The present invention generally comprises a method and apparatus for molding or casting ophthalmic lenses or the like. Salient features of the invention are the provision of simplified process and apparatus that automatically determines the proper amount of casting or molding compound remaining in the finished lens, and further determines the spacing of the molding or casting dies and thus the thickness of the finished lens.

The apparatus includes a plurality of front surface and back surface dies having differing optical forming surfaces and identical peripheral edge configurations. In the compression molding process, any pair of front surface and back surface dies are received in sliding, sealing fashion in the bore of the molding apparatus. At least one of the pair of dies is provided with at least one gate channel formed in the peripheral edge thereof parallel to the axis of the bore and extending from the optical forming surface to a point adjacent to the opposite, external die surface. The gate channel comprises a vent through which excess molding compound is discharged from the molding cavity as the dies are urged together. As the gated die is fully inserted in the bore, the gate channel opening to the exterior is sealed by the bore surface, thus terminating the discharge effect and retaining a predetermined amount of molding material in the molding cavity. The molding material is then solidified by thermal or chemical reaction to form the finished lens. Thus the invention provides intrinsic control of the thickness of the molded part, while also providing positive venting of excess molding material.

In the casting process, the dies are partially inserted in the bore of a casting in sliding, sealing fashion, and the gate channel serves as an injection channel to introduce the casting compound into the casting cavity. The dies are urged together in the bore, the gate channel first serving to vent excess casting compound and gas from the casting cavity. Full die insertion in the bore causes the gate channel opening to the exterior to be sealed by the bore wall, thus terminating the discharge effect and retaining a predetermined amount of casting material in the casting cavity. The material is then cured or hardened by thermal or chemical reaction to form the finished lens. Thus the invention also provides intrinsic control of the thickness of the cast part, while also permitting easy filling of the casting cavity and venting of excess material and gas from the vent cavity.

BRIEF DESCRIPTION OF THE DRAWING

FIG. 1 is an exploded view of the lens molding embodiment of the present invention.

FIG. 2 is a plan view of a lens molding die formed in accordance with the present invention.

FIG. 3 is an enlarged, fragmentary side elevation of the lens molding die of FIG. 2, showing the gate channel formed in the peripheral edge thereof.

FIGS. 4–6 are sequential cross-sectional elevation views showing the lens molding process of the present invention.

FIGS. 7–9 are sequential cross-sectional elevation views showing the lens casting process of the present invention.

FIG. 10 is a perspective view of a lens formed by the present invention, showing the sprue created by the gate channel prior to removal thereof.

DESCRIPTION OF THE PREFERRED EMBODIMENT

The present invention generally comprises a method and apparatus for the fabrication of ophthalmic lenses and the like using molding and casting techniques. With regard to FIGS. 1–3, the apparatus for implementing the molding process embodiment of the invention includes a cylindrical member 11 having a cylindrical bore 12 extending axially therethrough. A front surface die 13 and a rear surface die 14 are also provided, each having respective optical forming surfaces configured to form a complementary optical surface and thus define the optical properties of the lens to be produced. As is known in the prior art, a large plurality of dies 13 and 14 are provided, each having unique optical forming surfaces, so that the invention may manufacture a variety of ophthalmic lenses covering the range of common corrective prescriptions. A common feature of all the front and rear surface dies is that the peripheral edges 16 and 17 thereof are dimensioned and configured to be slidably received in the bore 12 and to form a close tolerance, sealing engagement therewith.

A salient feature of the present invention is the provision of at least one gate channel 18 in a peripheral edge portion of at least one of the dies 13 or 14. In the embodiment of FIGS. 1-3, a pair of gate channels 18 are formed in the edge portion 16 of the front surface die 13. (Either die may be provided with gate channels, and the number of gate channels is not a critical factor.) The gate channels are oriented parallel to the axis of the cylindrical peripheral edge 16, and are disposed in diametrically opposed fashion. The gate channels 18 are narrow, each subtending an angle of a few degrees about the cylindrical axis of the die. Each channel intersects the optical forming surface at one end, and extends to a point adjacent to the opposed, outer die surface 21, as shown best in FIG. 3. The end of the channel and the adjacent outer die surface 21 define therebetween an intermediate lip 19.

The apparatus of FIGS. 1-3 is employed in a lens molding method depicted graphically in sequential FIGS. 4-6. As shown in FIG. 4, a front surface die 13 and a back surface die 14 are placed in confronting opposition in the bore 12 of the cylindrical member 11, to define a closed lens molding cavity. A charge of lens molding material 22 is disposed in the molding cavity between the dies. The lens molding material may be injected into the molding cavity, as disclosed in copending United States Patent Application Ser. No. 104,235 filed on 10/5/87 by David Spector and Jeff Kingsbury. Alternatively, the molding material may be loaded into the cavity after one of the dies is in place in the bore and before the other die is secured in the bore. In either case, it is generally necessary to use an amount of molding material in excess of the material that forms the finished lens, so that subsequent compression of the dies is effective to impress the optical forming surfaces into the material and form the desired molded optical surfaces.

After the components and molding material are assembled as shown in FIG. 4, the dies 13 and 14 are urged together in compressive action, applying substantial pressure to the molding material 22. The molding material flows under this pressure and assumes the conformation of the optical forming surfaces, and also flows out of the gate channels 18, as shown in FIG. 5. The gate channels 18 act as vents to discharge excess molding material 22, the displacement of the molding material from the cavity also permitting the dies to move further into the bore and closer together and approximate the spacing of the desired thickness of the finished lens. As the die 13 in particular is driven into the bore a sufficient distance so that the outer surface 21 thereof approaches the end of the bore, the lip 19 of each channel 18 enters the bore 12. At this point of die insertion the external openings of the channels 18 are sealed by the wall of the bore 12, and no further discharge from the gate channels can occur. Further compressive force applied to the dies cannot move the dies closer together, and serves only to apply greater pressure to the molding material. After the molding material solidifies (e.g., by cooling below the glass transition temperature, by catalysis, or the like) the dies are removed from the bore, and the finished lens is stripped from the dies.

It should be noted that the depth of insertion of the die 13 is controlled by the length of the gate channels 18, and that the depth of die insertion determines the thickness of the finished lens. Furthermore, the depth of die insertion is relatively independent of the initial amount of molding material placed in the molding cavity, since excess material is displaced from the cavity. Thus the apparatus provides a process that is self-regulating, producing finished lenses of uniform thickness without requiring precise control of the initial amount of molding material.

the process described above is suitable for molding thermoplastic materials such as polycarbonate, or thermosetting plastic, or other materials that can be cured or hardened by pressure, temperature, or chemical reaction while in the molding cavity.

With slight modification the present invention may be employed to cast ophthalmic lenses using casting compounds known in the prior art, such as CR39 and its equivalents. With regard to FIGS. 7-9, front surface die 13 and rear surface die 14 are provided and fashioned as before, including the gate channels 18 formed in the peripheral edge portion of at least one of the dies. The dies are received in the cylindrical bore 34 of a cylindrical, tubular sleeve 33, and form a slidable, sealing engagement with the bore wall. The sleeve 33 is provided with a thinner sidewall than the cylindrical member 11, due to the fact that very little pressure is employed in the casting process.

Initially, the dies 13 and 14 are inserted partially into the bore 34, the gate channels 18 extending outwardly of the bore 34. The gate channels may be used as an input port to load a charge of viscous, liquid casting material 32 into the casting cavity defined by the dies and the bore wall, as shown in FIG. 7. After a sufficient amount of casting material is placed in the cavity, the dies are urged further into the bore 34 and into closer spacing, using a low level of force applied to the dies. This action shrinks the casting cavity, first forcing unwanted air or other gases out of the cavity, and then forcing excess casting material to discharge through the gate channels 18, as shown in FIG. 8.

As the dies are moved into full insertion in the bore 34, the gate channels 18 are sealed by the wall of the bore 34, as explained in the previous embodiment. Thereafter no more casting material can be discharged from the casting cavity, as shown in FIG. 9, and the thickness of the lens to be formed is determined by the amount of casting material remaining in the casting cavity. Low force (from a spring device or the like, as is known in the prior art) is then applied to the dies to maintain the dies converging on the casting material as the material undergoes curing and solidification, due to thermal and/or chemical reaction. After the lens is completely formed, the dies are removed from the sleeve 33 and the finished lens is stripped from the dies.

As noted with regard to the previous embodiment, the depth of insertion of the die 13 is controlled by the length of the gate channels 18, and the depth of die insertion determines the thickness of the finished lens. Furthermore, the depth of die insertion is relatively independent of the initial amount of casting material placed in the casting cavity, since excess material is displaced from the cavity. Thus the apparatus provides a process that is self-regulating, producing finished lenses of uniform thickness without requiring precise control of the initial amount of casting material.

The lens 36 formed by either the casting process or the molding process described above appears as shown in FIG. 10. A plurality of sprues 37 extend from the peripheral edge portion of the lens, one sprue for each of the gate channels provided in the dies. The sprues 37 are narrow and weak, and may easily be removed from the lens by cutting, or manually by snapping them off at the base thereof. The sprues may also form a convenient "handle" to facilitate manual or machine transfer and handling of the finished lens. Due to the fact that all ophthalmic lenses are edged to fit into spectacle frames, the sprues 37 are cut away from the finished spectacle lens, and in no way interfere with the final lens product.

I claim:

1. A method for producing molded articles, comprising the steps of:

providing a bore in a molding apparatus, providing a pair of molding dies, said molding dies being received in said bore in sliding engagement, at least one of said dies having an article forming surface, an opposed, outer die surface, and a peripheral edge surface disposed to impinge on said bore in slidable, sealing fashion, providing at least one gate channel in said peripheral edge surface, said gate channel extending from an intersection with said article forming surface to a point adjacent to and spaced apart from said outer die surface, inserting said dies partially into said bore in confronting relationship with a charge of flowable molding material disposed therebetween, said article forming surface impinging on said molding material, urging said dies together to compress said charge of molding material and to cause said molding material to flow and assume the configuration of said article forming surface, the compression of said molding material also causing excess molding material to flow through and discharge from said gate channel, inserting said one of said dies into said bore to a depth sufficient to seal said gate channel and terminate discharge from said gate channel, and solidifying said molding material to form a finished article.

2. The method for producing molded articles of claim 1, further including the step of providing a pair of gate channels in said on die.

3. The method for producing molded articles of claim 1, wherein said article comprises an optical lens, and said article forming surface of said one die includes an optical forming surface.

4. The method for producing molded articles of claim 1, wherein said at least one gate channel extends generally parallel to the axis of said bore.

5. A method for producing cast articles, comprising the steps of:

providing a bore in a casting apparatus, providing a pair of casting dies, said casting dies being received in said bore in sliding, sealing engagement, at least one of said dies having an article forming surface, an opposed, outer die surface, and a peripheral edge surface disposed to impinge on said bore in slidable, sealing fashion, providing at least one gate channel in said peripheral edge surface, said gate channel extending from an intersection with said article forming surface to a point adjacent to and spaced apart from said outer die surface, inserting said dies partially into said bore in confronting relationship to define a casting cavity therebetween, injecting a charge of flowable casting material through said gate channel into said casting cavity, urging said dies together to compress said charge of casting material and to cause said casting material to flow and assume the configuration of said article forming surface, the compression of said casting material also causing excess casting material and gas to flow through and discharge from said gate channel, inserting said one of said dies into said bore to a depth sufficient to seal said gate channel and terminate discharge from said gate channel, and solidifying said casting material to form a finished article.

* * * * *